United States Patent
Yamada

(10) Patent No.: US 7,626,741 B2
(45) Date of Patent: Dec. 1, 2009

(54) IMAGE PROCESSING METHOD AND APPARATUS THEREOF

(75) Inventor: Naoto Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 433 days.

(21) Appl. No.: 11/553,855

(22) Filed: Oct. 27, 2006

(65) Prior Publication Data
US 2007/0097439 A1    May 3, 2007

(30) Foreign Application Priority Data
Oct. 28, 2005    (JP) .............................. 2005-314841

(51) Int. Cl.
G03F 3/08     (2006.01)
G06F 15/00    (2006.01)
H04N 1/46     (2006.01)
G06F 3/12     (2006.01)
H04N 1/405    (2006.01)

(52) U.S. Cl. ..................... 358/518; 358/1.9; 358/501; 358/1.15; 358/3.1

(58) Field of Classification Search .................. None
See application file for complete search history.

(56) References Cited

U.S. PATENT DOCUMENTS

2002/0113984 A1*  8/2002  Nakajima et al. ............. 358/1.9
2004/0085378 A1*  5/2004  Sievert et al. ................. 347/19

* cited by examiner

*Primary Examiner*—Twyler L Haskins
*Assistant Examiner*—Barbara D Reinier
(74) *Attorney, Agent, or Firm*—Fitzpatrick, Cella, Harper & Scinto

(57) ABSTRACT

Recent copying machines have higher image quality, and the halftone processing methods are diversifying. If automatic tone correction is applied in correspondence with the diversified halftone processing methods, a long operation time is required. Hence, a sample chart based on the sample data is formed by a printer. A reader acquires image data of the sample chart, and the tone correction characteristics of a density correction unit corresponding to the image processing are updated based on the image data of the sample chart. In this case, generation of sample charts and updating of the tone correction characteristics are controlled in accordance with a user instruction as to whether or not to execute batch update processing of the tone correction characteristics of the density correction unit corresponding to the plurality of halftone processing methods.

12 Claims, 22 Drawing Sheets

FIG. 10B

SELECT AUTOMATIC TONE CORRECTION METHOD:

⦿ "ALL CORRECTION"

APPLY BATCH CORRECTION FOR ALL HALFTONE PROCESSES

○ "MANUAL CORRECTION"

APPLY INDIVIDUAL CORRECTION FOR EACH HALFTONE PROCESS

CANCEL

PRESS PRINT START BUTTON IF YOU ARE OK WITH FOLLOWING SETTINGS.

- CORRECTION TYPE: AUTOMATIC TONE CORRECTION

CORRECT TINT

- CORRECTION METHOD: "ALL CORRECTION"

APPLY BATCH CORRECTION FOR ALL HALFTONE PROCESSES

[CANCEL]

[SAMPLE CHART PRINT START]

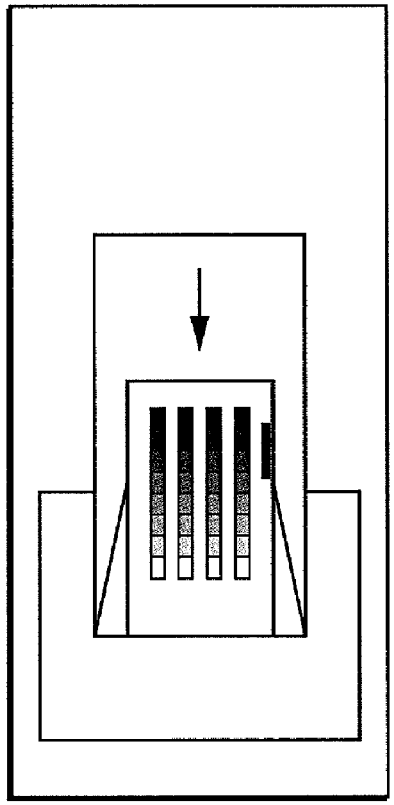

FIG. 10E

PRESS PRINT START BUTTON IF YOU WANT TO APPLY CORRECTION FOR FOLLOWING HALFTONE PROCESS.

- HALFTONE PROCESS PATTERN NO. 1

"ERROR DIFFUSION PROCESS"

[SAMPLE CHART PRINT START]   [CANCEL]

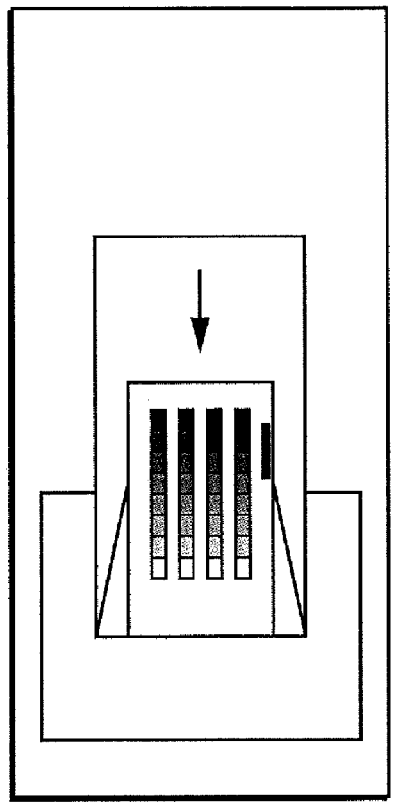

R PLANE

G PLANE

B PLANE

FIG. 16A
SELECT HALFTONE PROCESS REQUIRED TO EXECUTE AUTOMATIC TONE CORRECTION
   
☐ ERROR DIFFUSION PROCESS
☑ SCREEN PROCESS 1
☑ SCREEN PROCESS 2
☐ SCREEN PROCESS 3
CANCEL
OK

FIG. 16B

PRESS PRINT START BUTTON IF YOU WANT TO EXECUTE AUTOMATIC TONE CORRECTION FOR SELECTED HALFTONE PROCESSES BELOW.

SELECTED HALFTONE PROCESS PATTERN

- "SCREEN PROCESS 1"
- "SCREEN PROCESS 2"

[SAMPLE CHART PRINT START]  [CANCEL]

IMAGE PROCESSING METHOD AND APPARATUS THEREOF

BACKGROUND OF THE INVENTION

1. Field of the Invention

The present invention relates to image processing for updating tone correction characteristics.

2. Description of the Related Art

A multi-functional peripheral equipment (MFP) which comprises copy, printer, and facsimile functions together suffers variations of the density characteristics of an output image due to factors of use environment, use frequency, and the like. For example, an electrophotography process includes processes, i.e., formation of a latent image on a photosensitive body by laser exposure, development of the latent image by toner, transfer of a toner image onto a print sheet, and fixing of toner by heat. These processes are susceptible to the influence of the temperature or humidity around the MFP and aging of its components, and a change in toner amount to be fixed on the print sheet causes density variations of an output image.

Variations of the density characteristics of an output image due to the environment (temperature and humidity), use frequency, and the like are not unique to the electrophotography system, but similarly occur in other systems such as an ink-jet printing system, thermal transfer system, and the like.

As a technique for reducing density variations, a method of generating a density correction table according to the density variations of an output image and correcting the density characteristics of image data is known.

FIG. 1 shows the density characteristics of an output unit of an image forming apparatus. The ordinate plots the output density: the value "0" represents white and the value "255" represents solid black. The abscissa plots data to input to the output unit: the value "0" represents white and the value "255" represents black. Ideal density characteristics of the output unit are linear characteristics indicated by a broken line 1400. When input data changes linearly, the density of a printout desirably changes linearly. However, the density characteristics of the output unit are influenced by the environment and use frequency, and exhibit a change indicated by a solid curve 1401, 1402, or 1403. Therefore, in order to make the density characteristics of a printout linear, the input data must be corrected using a tone correction table.

FIG. 2 is a graph for explaining a tone correction table. The ordinate plots output data: the value "0" represents white and the value "255" represents black. The abscissa is the same as that in FIG. 1.

When the output unit exhibits the density characteristics indicated by the solid curve 1401, correction characteristics 1501 symmetric to the axis of the broken line 1400 (or 1500) are set. Likewise, when the solid curve 1402 represents the density characteristics, correction characteristics 1502 are set. When the solid curve 1403 represents the density characteristics, correction characteristics 1503 are set. The tone correction table has input and output values of the correction characteristics 1501, 1502, and 1503 as table values. By correcting input data using the tone correction table, linear output density can be realized.

There are some methods of obtaining the correction characteristics. For example, an automatic tone correction method or the like is known. In this method, tone patches of Y, M, C, and K colors are printed as a sample chart, and the printed sample chart is read. Linear correction characteristics are created for Y, M, C, and K, respectively, and are set in a tone conversion (gamma conversion) unit.

A recent image forming apparatus has a plurality of halftone processing methods. For example, the density characteristics of an image binarized by error diffusion are different from those of an image binarized by halftone screen (dithering). Therefore, density correction using the tone correction table executes a method of correcting image data by creating a tone correction table corresponding to each halftone processing method.

Automatic tone correction of an image forming apparatus having a plurality of halftone processing methods requires operations for printing sample charts for respective halftone processing methods, and sequentially reading these sample charts. A controller that controls the automatic tone correction determines the halftone processing methods corresponding to the sample charts based on the read order of the sample charts, and reflects them to tone correction tables corresponding to the halftone processing methods. For example, upon execution of the automatic tone correction for three different halftone processing methods, a sample chart is printed and read for halftone processing methods. Therefore, a total of three print and read processes are required.

Especially, since the recent copying machine and MFP have high image quality and the halftone processing methods are diversifying, if the aforementioned automatic tone correction is carried out, a considerably long operation time is required. If automatic tone correction processes corresponding to many types of halftone processing methods are continuously executed, human errors such as wrong sample charts to be read, wrong directions of sample charts to be read, and the like readily occur.

SUMMARY OF THE INVENTION

The first aspect of the present invention discloses an image processing apparatus having a reader which reads an original image, an image processor which is capable of executing plural kinds of image processing, a corrector which corrects image data output from the image processor, and a forming section which forms an image on a recording medium based on image data output from the corrector, the apparatus comprising: a generator, arranged to generate sample data, and to control the forming section to form a sample chart based on the sample data; an updater, arranged to update tone correction characteristics of the corrector corresponding to the image processing based on image data of the sample chart acquired by the reader, wherein the sample chart is conveyed by using a feeder of the reader; and a controller, arranged to control the generator and the updater in accordance with an input user instruction indicating whether or not to execute batch update processing of the tone correction characteristics of the corrector corresponding to the plural kinds of image processing.

The second aspect of the present invention discloses an image processing apparatus having a reader which reads an original image, an image processor which is capable of executing plural kinds of image processing, a corrector which corrects image data output from the image processor, and a forming section which forms an image on a recording medium based on image data output from the corrector, the apparatus comprising: a generator, arranged to generate sample data, and to control the forming section to form a sample chart based on the sample data; an updater, arranged to update tone correction characteristics of the corrector corresponding to the image processing based on image data of the sample chart acquired by the reader, wherein the sample chart is conveyed by using a feeder of the reader; and a controller, arranged to control the generator and the updater in accordance with an input user instruction indicating image processing used to update the tone correction characteristics of the plural kinds of image processing.

According to the present invention, operations required to update the tone correction characteristics can be reduced.

The third aspect of the present invention discloses an image processing apparatus having a reader which reads an original image, an image processor which is capable of executing plural kinds of image processing, a corrector which corrects image data output from the image processor, and a forming section which forms an image on a recording medium based on image data output from the corrector, the apparatus comprising: a generator, arranged to generate sample data, and to control the forming section to form a sample chart based on the sample data; an updater, arranged to update tone correction characteristics of the corrector corresponding to the image processing based on image data of the sample chart acquired by the reader, wherein the sample chart is conveyed by using a feeder of the reader; and a controller, arranged to control the generator and the updater in accordance with an input user instruction indicating whether or not to execute batch update processing of the tone correction characteristics of the corrector corresponding to the plural kinds of image processing, wherein the generator which received the batch update instruction appends information required to identify image processing used in generation of the sample data to the sample data.

The fourth aspect of the present invention discloses an image processing apparatus having a reader which reads an original image, an image processor which is capable of executing plural kinds of image processing, a corrector which corrects image data output from the image processor, and a forming section which forms an image on a recording medium based on image data output from the corrector, the apparatus comprising: a generator, arranged to generate sample data, and to control the forming section to form a sample chart based on the sample data; an updater, arranged to update tone correction characteristics of the corrector corresponding to the image processing based on image data of the sample chart acquired by the reader, wherein the sample chart is conveyed by using a feeder of the reader; and a controller, arranged to control the generator and the updater in accordance with an input user instruction indicating image processing used to update the tone correction characteristics of the plural kinds of image processing, wherein the generator appends information required to identify image processing used in generation of the sample data to the sample data.

Errors in the update operation of the tone correction characteristics can be prevented.

Further features of the present invention will become apparent from the following description of exemplary embodiments with reference to the attached drawings.

BRIEF DESCRIPTION OF THE DRAWINGS

FIGS. 10A to 10F are views for explaining user interfaces to be displayed in automatic tone correction;

FIGS. 16A and 16B are views for explaining user interfaces to be displayed in automatic tone correction.

DESCRIPTION OF THE EMBODIMENTS

Image processing according to preferred embodiments of the present invention will be described in detail hereinafter with reference to the accompanying drawings.

First Embodiment

[Arrangement of Image Forming Apparatus]

Figure 1:
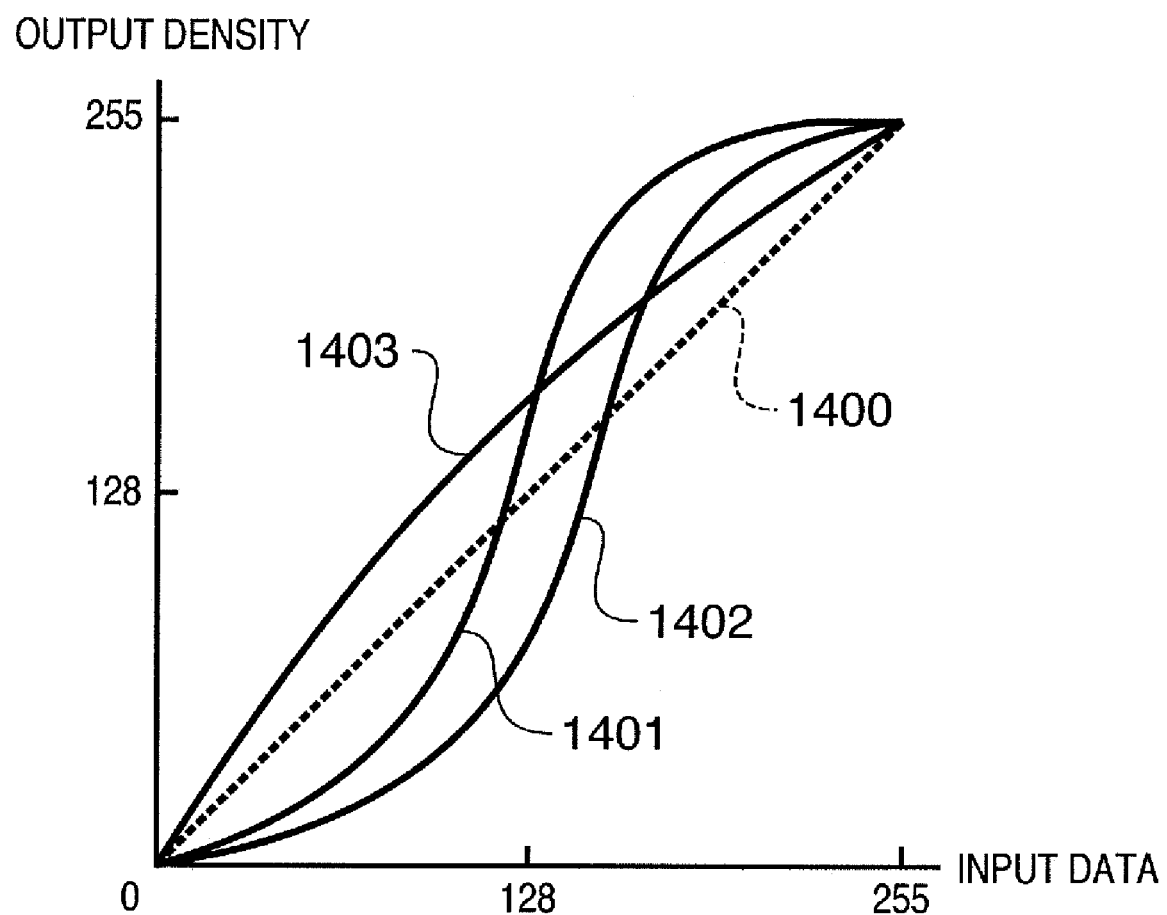
FIG. 1 is a graph showing the density characteristics of an output unit of an image forming apparatus.
Figure 2:
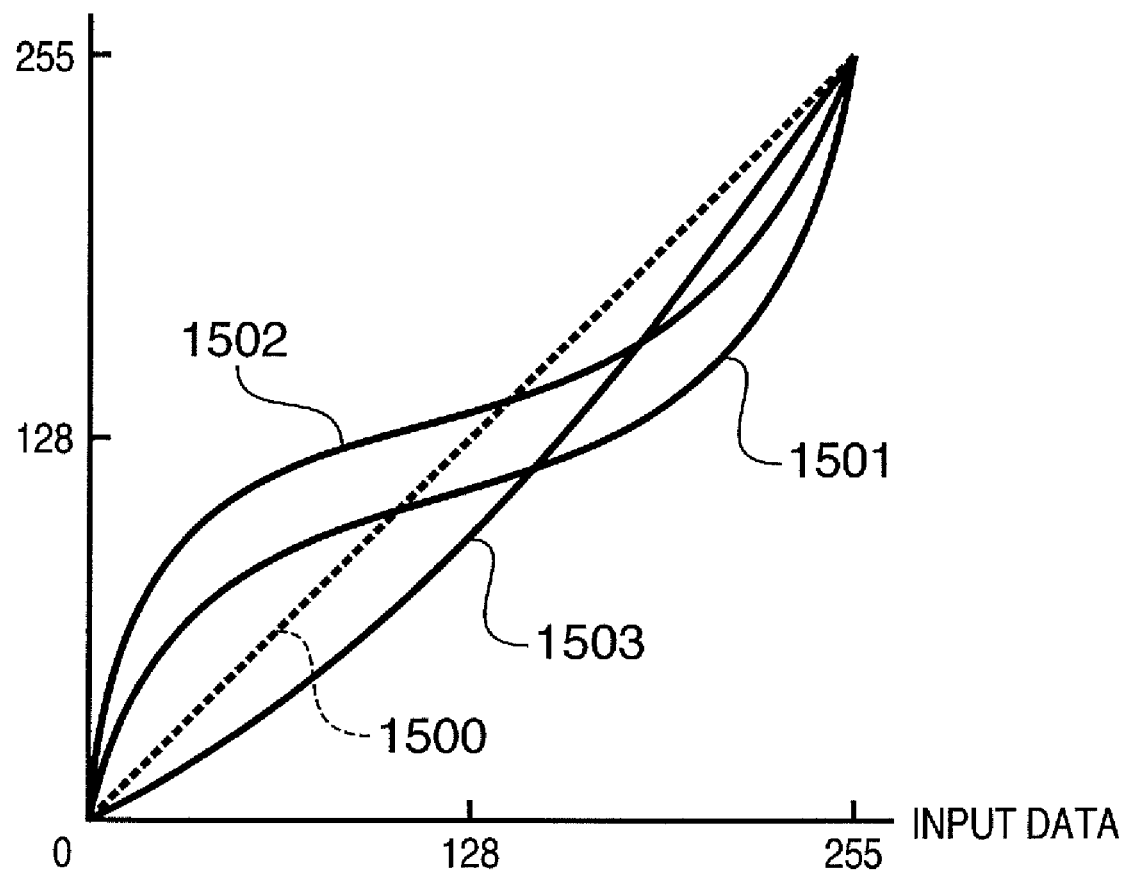
FIG. 2 is a graph for explaining a tone correction table.
Figure 3:
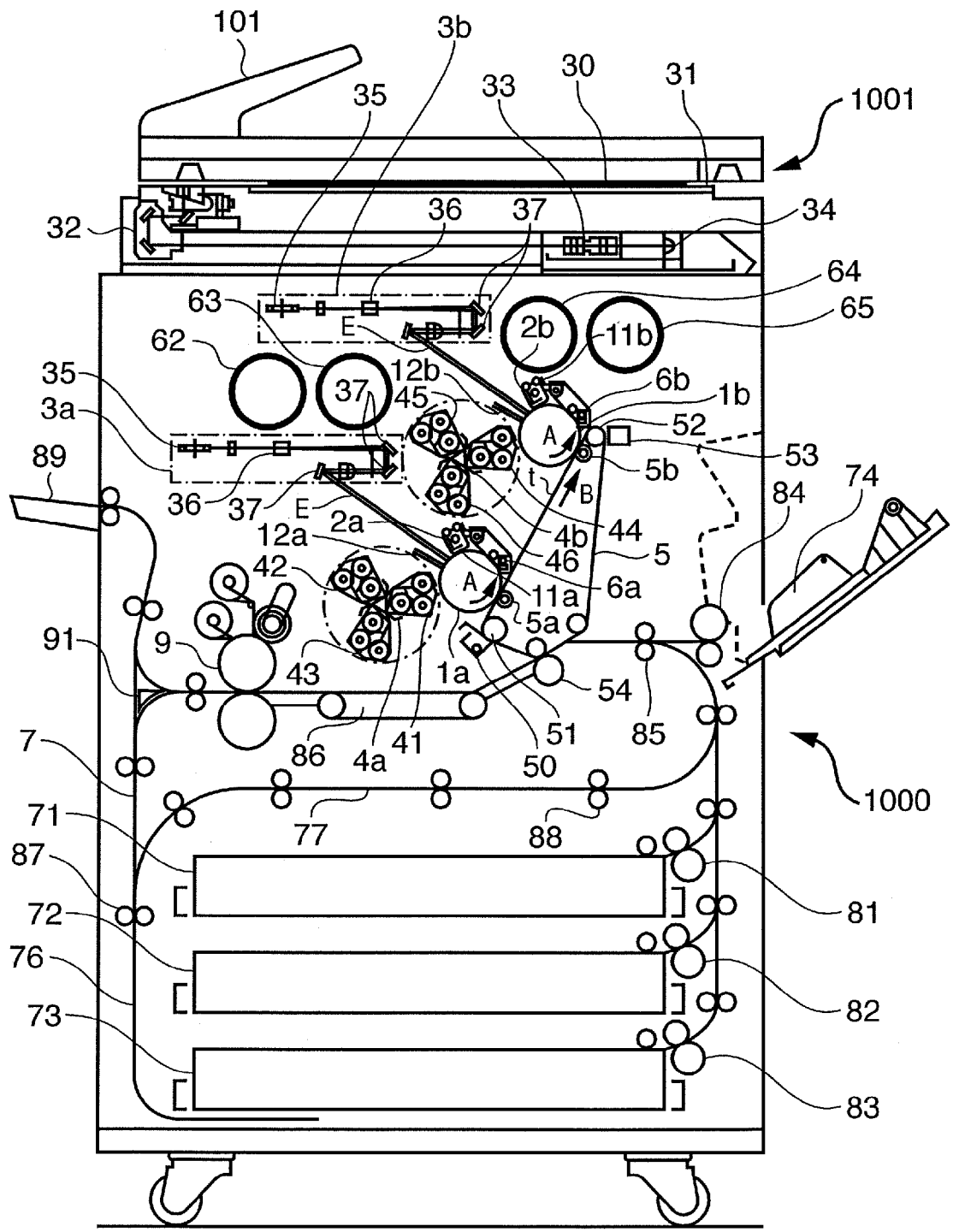
FIG. 3 is a schematic view of an image forming apparatus according to an embodiment of the present invention.

FIG. 3 is a schematic view of an image forming apparatus according to this embodiment.

The image forming apparatus has an automatic document feeder (ADF) 101 and reader 1001 in its upper portion, and a printer 1000 in its lower portion.

The ADF 101 feeds one or two originals each to a predetermined position of a platen glass 31. The reader 1001 exposes an original 30 placed on the platen glass 31 with light of a lamp in a scanner unit 32, and moves the scanner unit 32 in a sub-scan direction. Light reflected by the original 30 forms an image on an image sensor 34 via mirrors of the scanner unit 32 and an f-θ lens 33.

The printer 1000 roughly has two image forming units: a first image forming unit including a photosensitive drum 1a, and a second image forming unit including a photosensitive drum 1b. These image forming units have nearly the same structures (shapes) to attain a cost reduction. That is, developers 41 to 46 to be described later have nearly the same structures and shapes and, hence, these image forming units can operate even when the developers 41 to 46 are replaced with each other.

The two photosensitive drums 1a and 1b as image carriers are rotatable in the direction of an arrow A shown in FIG. 3. The following components are arranged around the photosensitive drums 1a and 1b, respectively. An exposure system includes pre-exposure lamps 11a and 11b, corona chargers 2a and 2b, exposure units 3a and 3b of an optical system, and potential sensors 12a and 12b. A developing system includes movable members (developing rotaries) 4a and 4b as holding members of the rotary developers and three developers 41 to 43 and 44 to 46 which store different color developing agents (toners) in the respective holding members, primary transfer rollers 5a and 5b, and cleaning devices 6a and 6b.

Upon image formation, the photosensitive drums 1a and 1b rotate in the direction of the arrow A and are discharged by the pre-exposure lamps 11a and 11b. After that, the surfaces of the photosensitive drums 1a and 1b are uniformly charged by the chargers 2a and 2b. Meanwhile, the exposure units 3a and 3b convert image data input from the reader 1001 into optical signals by laser output units (not shown). These optical signals (laser beams E) are reflected by polygonal mirrors 35, and strike the exposure positions on the surfaces of the photosensitive drums 1a and 1b via lenses 36 and reflection mirrors 37. In this way, electrostatic latent images for toner colors (separated colors) are formed on the photosensitive drums 1a and 1b.

The developing rotaries 4a and 4b are rotated to move the developers 41 and 44 to the developing positions on the photosensitive drums 1a and 1b. After that, the developers 41 and 44 are activated (by applying developing biases to them), thus developing the electrostatic latent images on the photosensitive drums 1a and 1b. On the photosensitive drums 1a and 1b, images of toners made up of a resin and pigment as base substances are formed. The next developing process develops electrostatic latent images using the developers 42 and 45, and the still next developing process develops them using the developers 43 and 46.

The toners stored in the developers 41 to 46 are replenished from toner storage units (hoppers) 62 to 65 which are arranged between the exposure units 3a and 3b or beside the exposure unit 3b at predetermined timings as needed so as to keep toner ratios (or toner amounts) in the developers constant.

The toner images formed on the photosensitive drums 1a and 1b are sequentially transferred onto an intermediate transfer member (intermediate transfer belt) 5 as a transfer medium by the primary transfer rollers 5a and 5b to overlap each other. At this time, primary transfer biases are applied to the primary transfer rollers 5a and 5b.

The photosensitive drums 1a and 1b are set to contact a flat surface (transfer surface t) formed by the intermediate transfer belt 5 which is extended by a driving roller 51 and driven roller 52. The primary transfer rollers 5a and 5b are set at the positions opposing the photosensitive drums 1a and 1b.

A sensor 53 for detecting the misregistration and densities of images transferred from the photosensitive drums 1a and 1b is set at a position opposing the driven roller 52. Based on information obtained by this sensor 53, control for correcting the image densities of the image forming units, toner replenish amounts, image write timings, image write start positions, and the like are executed as needed.

Upon repeating formation of the electrostatic latent images, development, and primary transfer three times in the two image forming units, a full-color toner image obtained by sequentially overlapping four color toner images is formed on the intermediate transfer belt 5. After that, the full-color toner image simultaneously undergoes secondary transfer onto a print sheet. At this time, a secondary transfer bias is applied to a secondary transfer roller 54.

A transfer cleaning device 50 is arranged at a position opposing the driving roller 51. The transfer cleaning device 50 removes residual toner on the intermediate transfer belt 5 that has undergone the secondary transfer. By pushing the intermediate transfer belt 5 toward the transfer cleaning device 50 by the driving roller 51, the intermediate transfer belt 5 is brought into contact with the transfer cleaning device 50, thus cleaning the belt 5. After completing cleaning, the intermediate transfer belt 5 separates from the transfer cleaning device 50. The intermediate transfer belt 5 after cleaning undergoes the next image formation.

In this process, print sheets are conveyed one by one from print sheet cassettes 71, 72, and 73 or a manual insertion tray 74 by paper feed rollers 81, 82, 83, or 84 to the image forming units. Registration rollers 85 correct any skew of a print sheet, which is fed to a secondary transfer position in synchronism with the paper feed timing.

A print sheet on which the full-color toner image is transferred is conveyed by a conveyor belt 86, and the toner image is fixed by a heat roller fixing device 9. The print sheet is then exhausted onto an exhaust tray 89 or to a post-processing apparatus (not shown).

Upon forming images on the two surfaces of a print sheet, a convey path switching guide 91 is driven to temporarily guide the print sheet which has passed through the heat roller fixing device 9 to a reverse path 76 via a convey vertical path 7. After that, reverse rollers 87 are rotated in the reverse direction to allow the print sheet exit the reverse path 76 so as to have the trailing end of the print sheet upon guiding onto the reverse path 76 as the leading end, and to guide the print sheet onto a double-sided convey path 77. The print sheet is fed to the registration rollers 85 by double-sided convey rollers 88 via the double-sided convey path 77, and then undergoes formation of a full-color image on the other surface by the image forming process.

[Arrangement of Controller]

Figure 4:
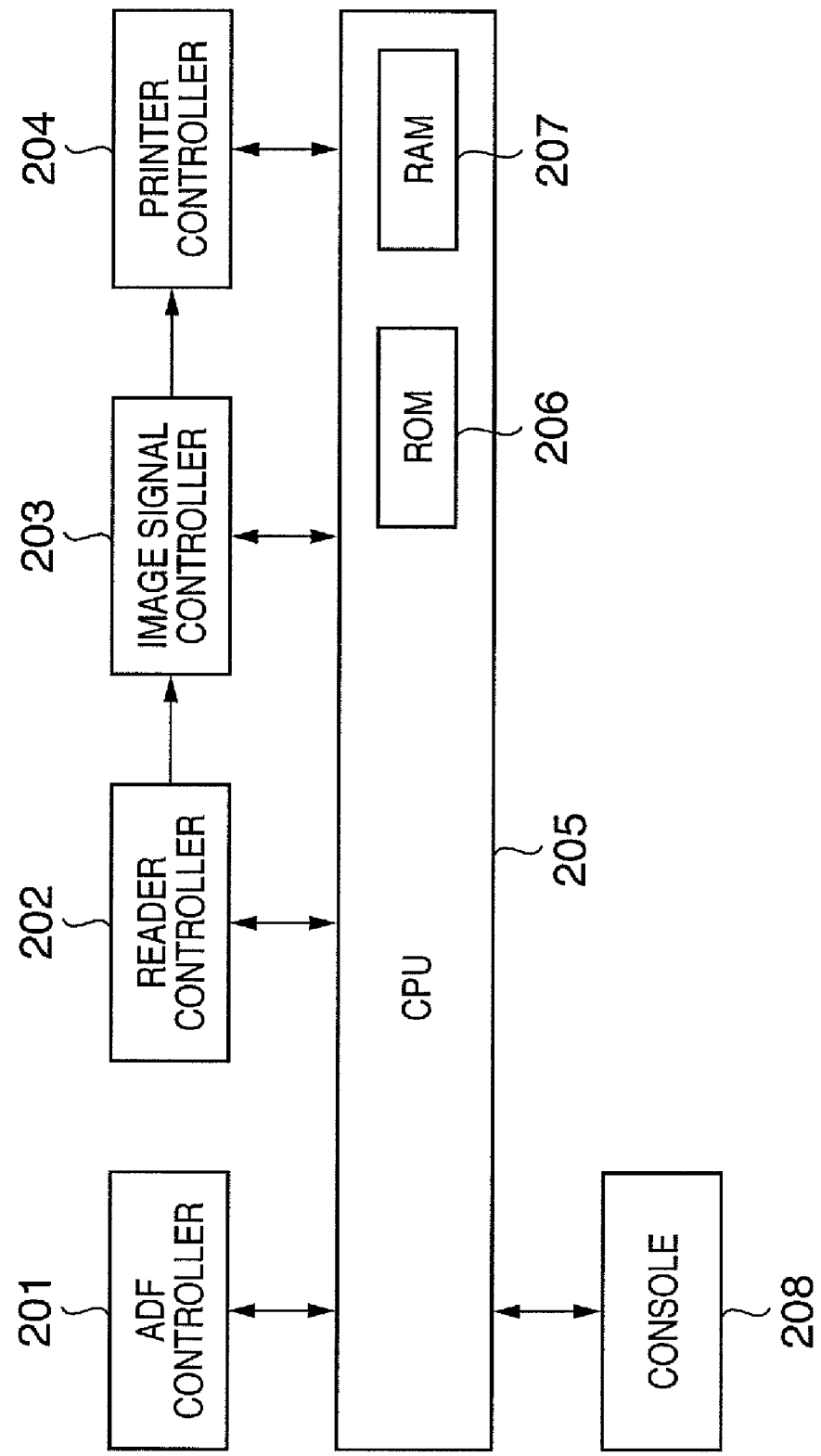
FIG. 4 is a block diagram showing the arrangement of a controller.

FIG. 4 is a block diagram showing the arrangement of a controller for controlling the image forming apparatus shown in FIG. 4.

Referring to FIG. 4, a CPU 205 is a one-chip microcontroller or the like which incorporates a ROM 206, RAM 207, and the like. The CPU 205 systematically controls respective components of the controller based on control programs stored in the ROM 206.

An ADF controller 201 controls the operation of the ADF 101 to control supply of an original set on the ADF 101. A reader controller 202 controls the operation of the reader 1001 to supply an analog image signal output from the image sensor 34 to an image signal controller 203. A printer controller 204 controls the operation of the printer 1000 to drive the exposure units 3a and 3b based on a video signal output from the image signal controller 203. A console 208 is a user interface which comprises a start key used to instruct start of image formation, mode setting keys, display, and the like, and notifies the CPU 205 of a user's instruction input to display the operating state and setting state of the apparatus by the CPU 205.

The CPU 205 controls the image signal controller 203 to process an image signal output from the reader controller 202 and to input the processed signal to the printer controller 204. The CPU 205 then controls the printer controller 204 to convert an image signal into optical signals by the exposure units 3a and 3b, to irradiate the photosensitive drums 1a and 1b with the optical signals, and to form electrostatic latent images on the photosensitive drums 1a and 1b, thus executing the aforementioned electrophotographic process.

[Image Signal Controller]

Figure 5:
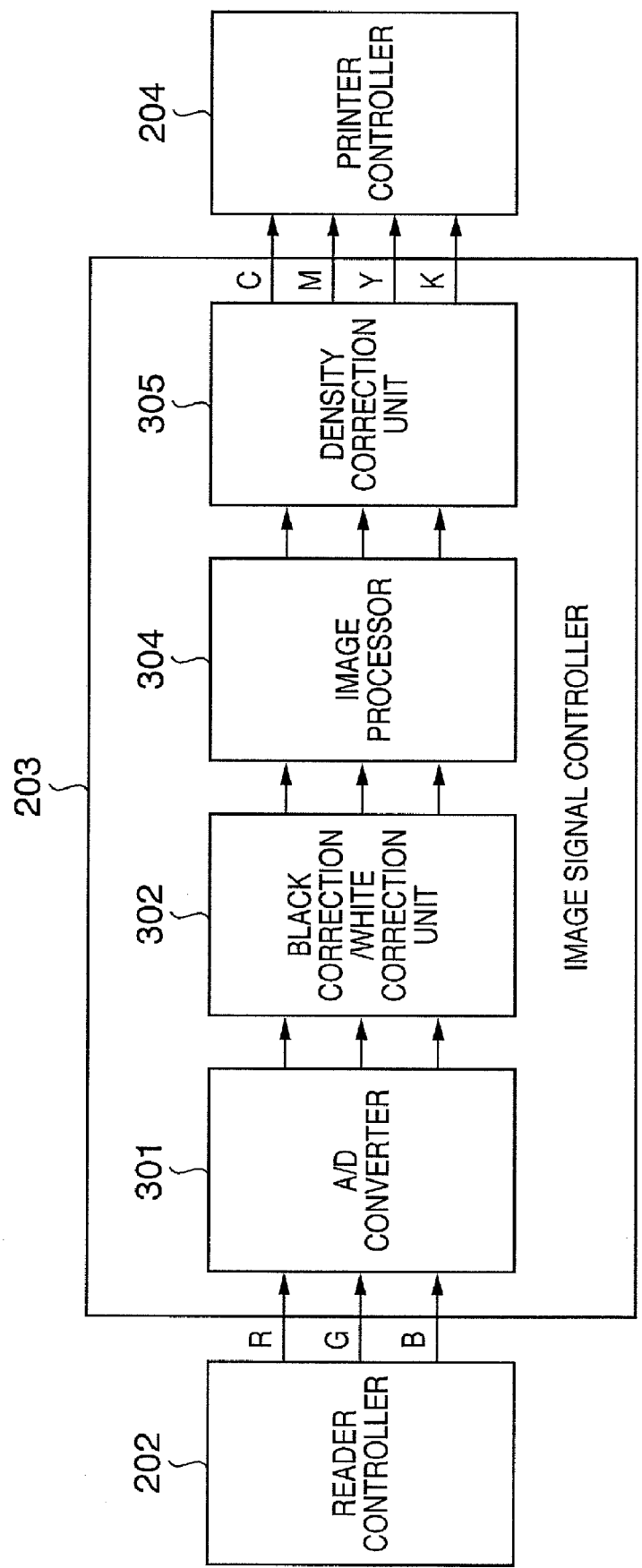
FIG. 5 is a block diagram showing the arrangement of an image signal controller.

FIG. 5 is a block diagram showing the arrangement of the image signal controller 203.

An A/D converter 301 converts analog RGB signals output from the reader controller 202 into digital RGB signals (e.g., 8 bits per color). A black correction/white correction unit 302 applies shading correction to the digital RGB signals. An image processor 304 receives RGB luminance signals, and performs an enlargement/reduction process, pseudo halftone process, and the like. A density correction unit 305 receives the RGB luminance signals from the image processor 304, and performs a luminance-density conversion process, under-color removal (UCR) and masking process, tone correction process, and the like. CMYK density signals output from the density correction unit 305 are input to the printer controller 204.

Image Processor

Figure 6:
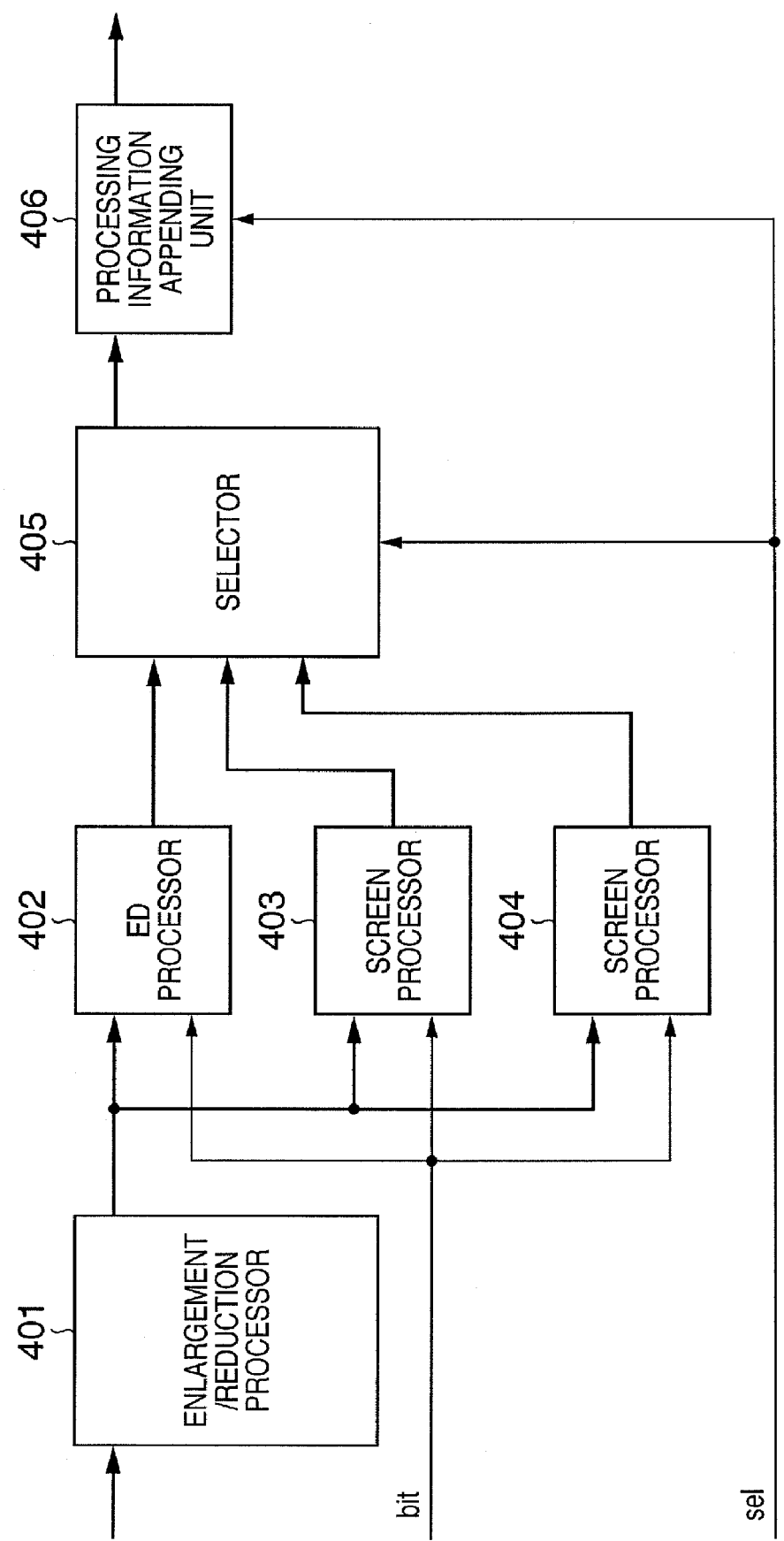
FIG. 6 is a block diagram showing the arrangement of an image processor.

FIG. 6 is a block diagram showing the arrangement of the image processor 304.

Referring to FIG. 6, an enlargement/reduction processor 401 performs various kinds of digital image processing such as an image rotation process, image composition process, and the like in addition to the aforementioned enlargement/reduction process. An ED processor 402 executes a halftone process based on an error diffusion (ED) process. Screen processors 403 and 404 respectively execute halftone processes based on a screen process. Note that the screen processors 403 and 404 execute the halftone processes with different screen ruling values, screen angles, and the like. The number of bits of image data after the halftone process, which is output from each of the ED processor 402 and screen processors 403 and 404, can be switched by a switching signal bit.

A selector 405 selectively switches and outputs image data output from the ED processor 42 and screen processors 403 and 404 using a select signal sel. More specifically, for example, when a 2-bit select signal sel is '00', the selector 405 selects the output from the ED processor 402; when sel='01', it selects the output from the screen processor 403; and when sel='10', it selects the output from the screen processor 404. A processing information appending unit 406 appends image data of halftone processing information (to be described later) to the image data output from the selector 405, so that the halftone processing information is printed at a predetermined position of a sample chart according to the select signal sel.

Halftone Processing Method

Figure 7:
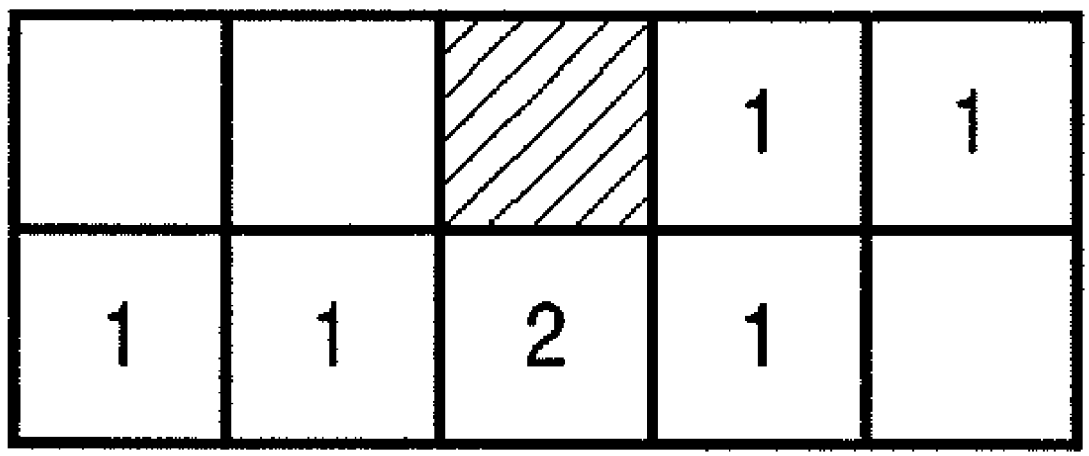
FIG. 7 shows an example of an error diffusion matrix.

FIG. 7 shows an example of an error diffusion matrix.

The error diffusion process to be executed by the ED processor 402 distributes errors between input and output image data to pixels which neighbor a pixel of interest. More specifically, an error which is generated by binarization of the pixel of interest and is indicated by hatching in FIG. 7 is distributed to surrounding pixels by weighting it by weighting coefficients shown in FIG. 7. When input image data is binarized by, e.g., a threshold value "127", if the input image data is 200, output image data is "1". In this case, an error is calculated by 200−127=73. Then, in the example of FIG. 7, 73/7×2=21 are distributed (added) to a pixel one line below the pixel of interest, and 73/7=10 are distributed (added) to two right neighboring pixels, and left two pixels and lower right pixel one line below the pixel of interest.

Figure 8:
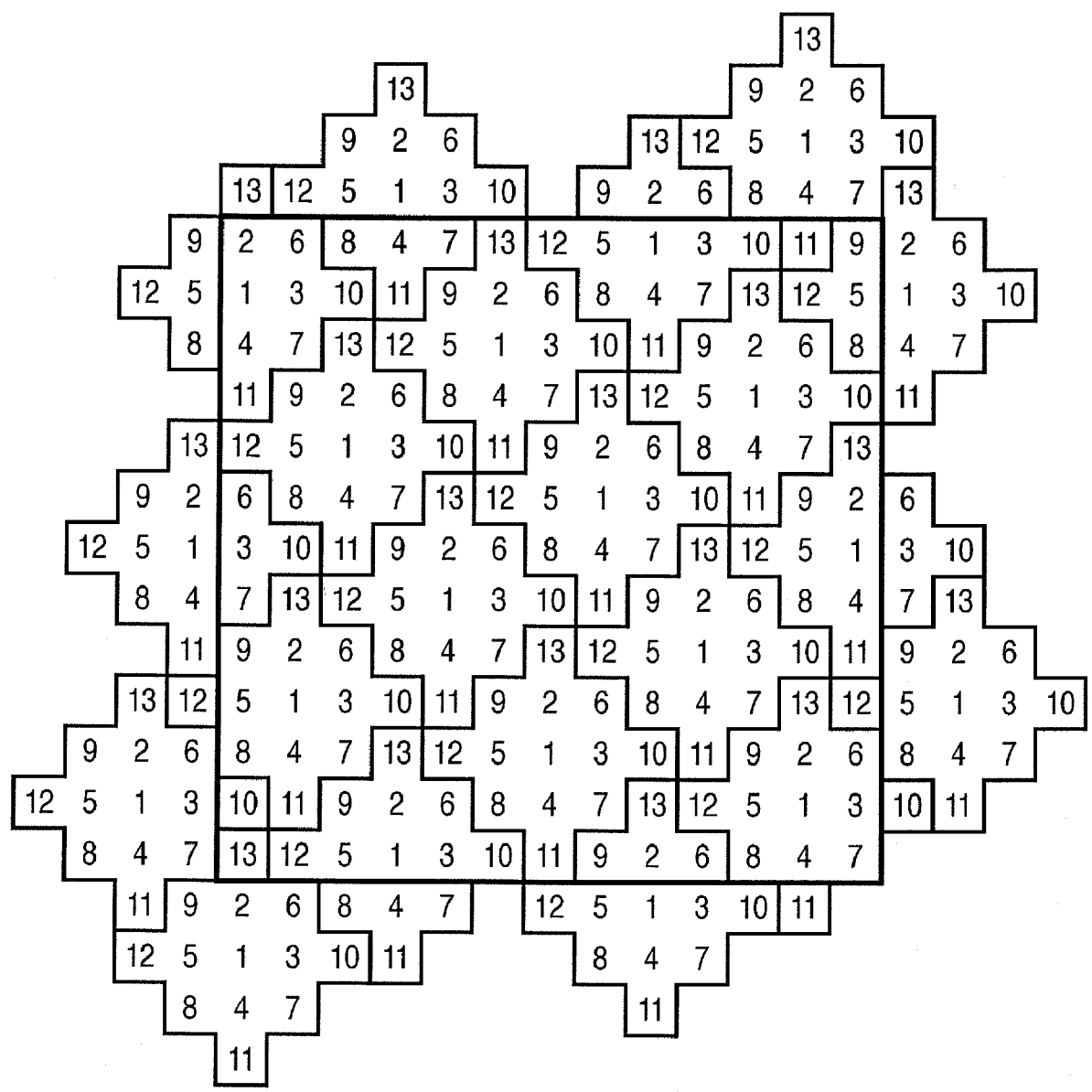
FIG. 8 shows an example of a screen matrix.

FIG. 8 shows an example of a screen matrix.

On the other hand, the screen process to be executed by each of the screen processors 403 and 404 is a processing method that uses a plurality of weighting filters called screen matrices which are arranged at a predetermined angle (screen angle), as shown in FIG. 8. Then, the priority order indicated by numerical values in FIG. 8 is determined. According to the priority order, halftone values are expressed to fatten the laser spot size from the center of the pixel using 16 tone levels if input image data is 4 bits. Of course, as described above, the screen processors 403 and 404 have different screen ruling values and screen angles.

[Automatic Tone Correction]

Figure 9:
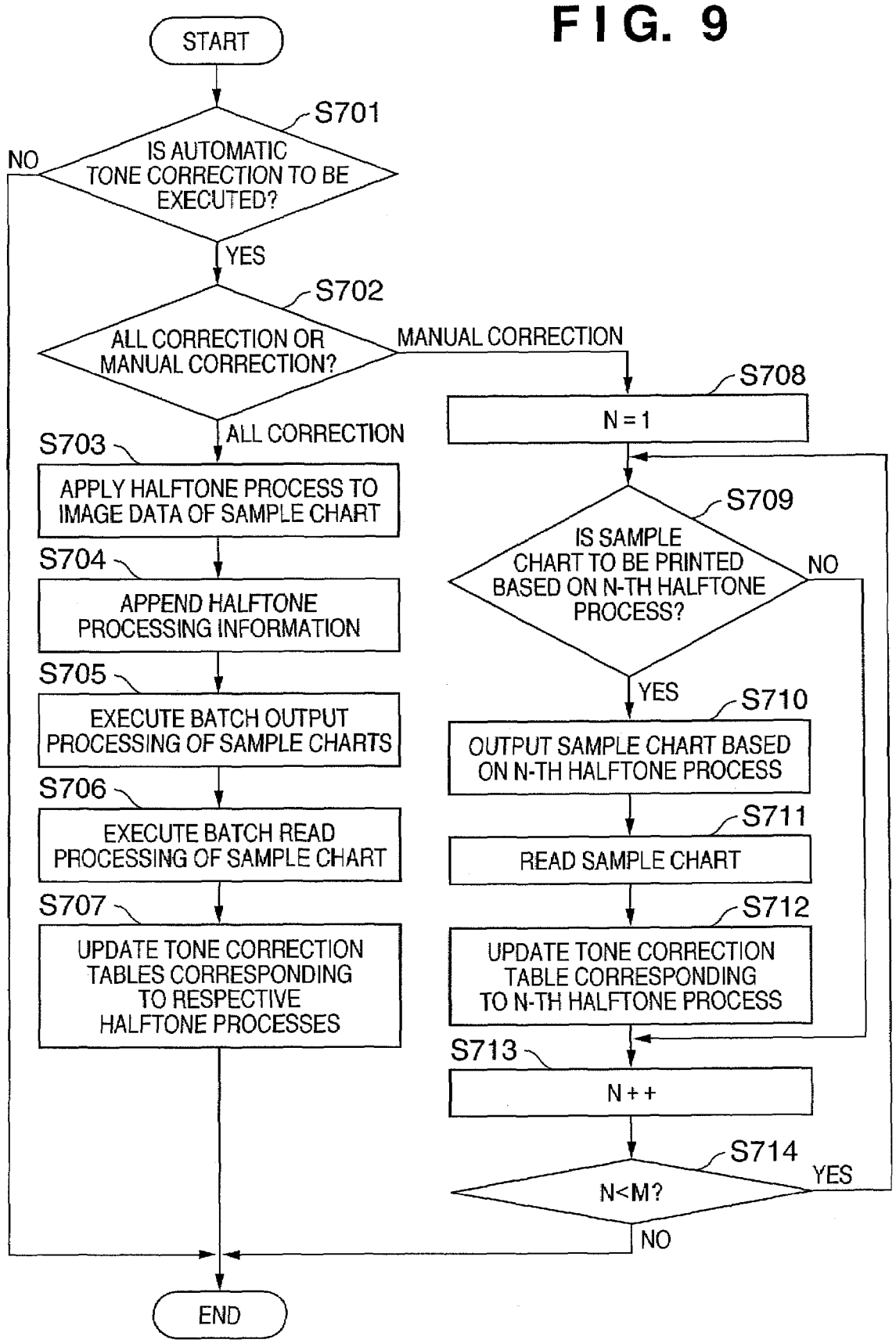
FIG. 9 is a flowchart showing the sequence of automatic tone correction processing.

FIG. 9 is a flowchart showing the sequence of the automatic tone correction processing. The CPU 205 executes this processing upon turning on the power switch of the image forming apparatus.

Output Sample Chart

Figure 10A:
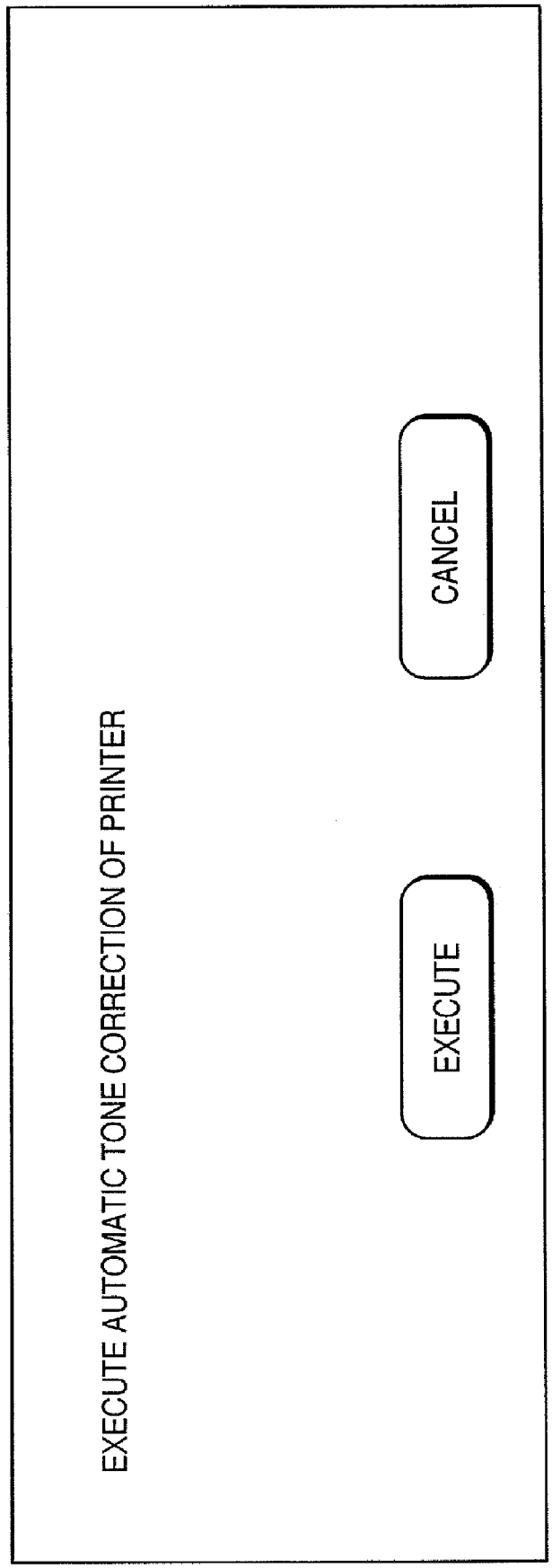

The CPU 205 displays a user interface (UT) shown in FIG. 10A on the console 208 to receive an instruction as to whether or not the user wants to execute automatic tone correction (S701). If the user cancels execution of automatic tone correction, the processing ends. If the user instructs to execute automatic tone correction, the CPU 205 displays a UI shown in FIG. 10B on the console 208 to receive an instruction as to whether the user wants to apply batch correction (all correction) including all halftone processes that can be executed by the image forming apparatus or to apply individual correction (manual correction) (S702).

If the user selects "all correction", the CPU 205 displays a confirmation dialog shown in FIG. 10C on the console 208, and waits until the user presses a "sample chart print start" button. If the user presses this button, the CPU 205 begins to print a sample chart using all halftone processes. If the user presses a cancel button, the CPU 205 displays the UI shown in FIG. 10B again.

Upon reception of the "all correction" and "sample chart print start" instructions, the CPU 205 renders image data of a sample chart on the RAM 207 based on sample chart data stored in the ROM 206. The CPU 205 then inputs the image data of the sample chart to the image processor 304. The image processor 304 switches the processing path of the image data by switching the select signal sel every time it receives the image data of the sample chart, and executes the halftone process using the ED processor 402 or the screen processor 403 or 404 (S703).

Then, the processing information appending unit 406 appends halftone processing information corresponding to the select signal sel to the image data of the sample chart that has undergone the halftone process (S704). That is, the unit 406 appends halftone processing information to print information indicating the halftone processing method at a predetermined position of the sample chart.

The CPU 205 sets to pass through the processing of the density correction unit 305, and sends the image data of sample charts output from the image processor 304 to the printer 1000, thus executing batch (continuous) output processing of the sample charts (S705)

Format of Sample Chart

Figure 11:
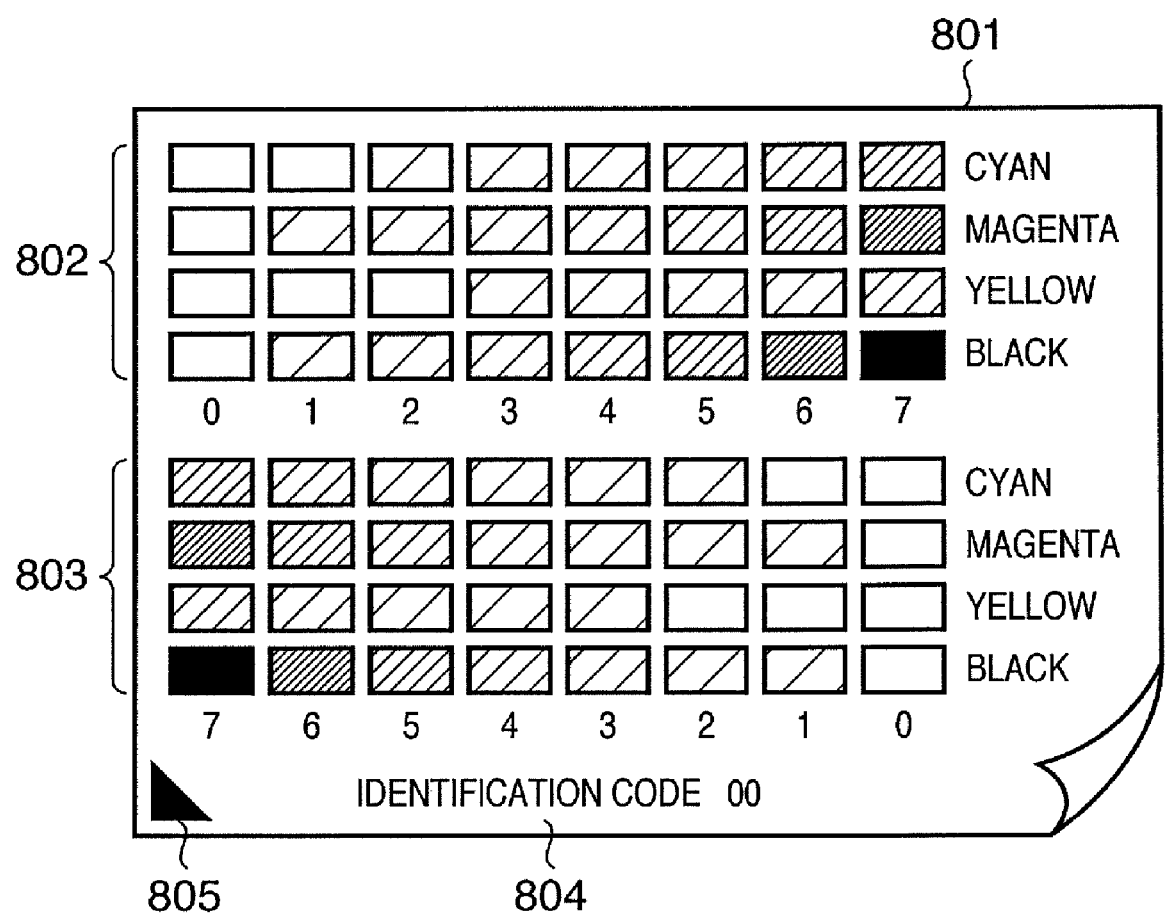
FIG. 11 shows an example of a sample chart for automatic tone correction.

FIG. 11 shows an example of a sample chart 801 for automatic tone correction.

A pattern 802 laid out on the upper portion of the sample chart 801 includes a group of patches formed by changing the attached area ratio of four color toners (cyan C, magenta M, yellow Y, and black K) used by the image forming apparatus to eight levels ranging from 0 to 100%. A pattern 803 on the lower portion includes a group of patches obtained by flipping that of the pattern 802 horizontally, and is used to absorb density nonuniformity of the printer 1000 and read nonuniformity of the scanner.

On the bottom portion of the sample chart 801, an identification code 804 as the halftone processing information used to identify one of the plurality of halftone processing methods to be applied to the sample chart is printed. The processing information appending unit 406 appends this identification code to the image data in accordance with the select signal sel.

After the batch print processing of the sample chart, the user picks up these sample charts and sets them on the ADF 101 in a designated direction. In this case, the CPU 205 displays a UI shown in FIG. 10D on the console 208 to instruct the user of the setting method of the sample chart, and waits for a sample chart read start instruction of the user.

Note that characters or symbols that can undergo character recognition, a barcode, or a two-dimensional code are preferably used as the identification code, but it may use a digital watermark as the identification code.

FIG. 11 shows the example in which direction information 805 of the sample chart 801 is appended. The direction information 805 is indispensable. However, using the direction information 805, whether or not the directions of the sample charts set on the ADF 101 or platen glass 31 are adequate can be determined. If the set direction is inadequate, the enlargement/reduction processor 401 rotates the read image based on the direction information, and can apply tone correction processing. Note that FIG. 11 shows the example of triangular direction information 805 indicating the lower left corner of the sample chart 801. However, the direction information is not particularly limited as long as the direction of the sample chart 801 can be determined.

Read Sample Chart

If the user presses a "sample chart read start" button on the UI shown in FIG. 10D, the CPU 205 instructs the reader controller 202 to execute batch (continuous) read processing of the plurality of sample charts set on the ADF 101. The reader controller 205 controls the operation of the ADF 101 to convey the respective sample chart to the predetermined position of the platen glass 31, and scans the respective sample chart to read the image of the respective sample chart. The CPU 205 stores image data which are output from the reader controller 202 and have undergone A/D conversion and shading correction by the image signal controller 203 in the RAM 207 (S706).

Next, the CPU 205 analyzes the image data of the sample charts stored in the RAM 207, calculates the density values of respective patches, and creates tone correction tables based on the calculated density values. The CPU 205 recognizes the identification code appended to each sample chart. If the identification code is '00', the CPU 205 updates the tone correction table of the density correction unit 305 corresponding to the ED processor 402 (S707). In this way, the CPU 205 creates the tone correction tables corresponding to all the read sample charts, and updates the tone correction tables of the density correction unit 305 corresponding to the identification codes appended to the sample charts.

Create Correction Table

Figure 12A:
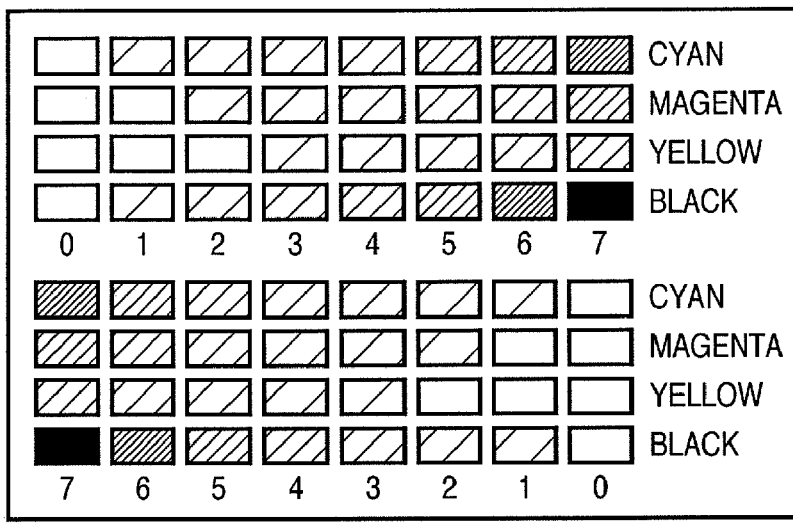
FIGS. 12A to 12C are views for explaining image data read from the sample chart.
Figure 12B:
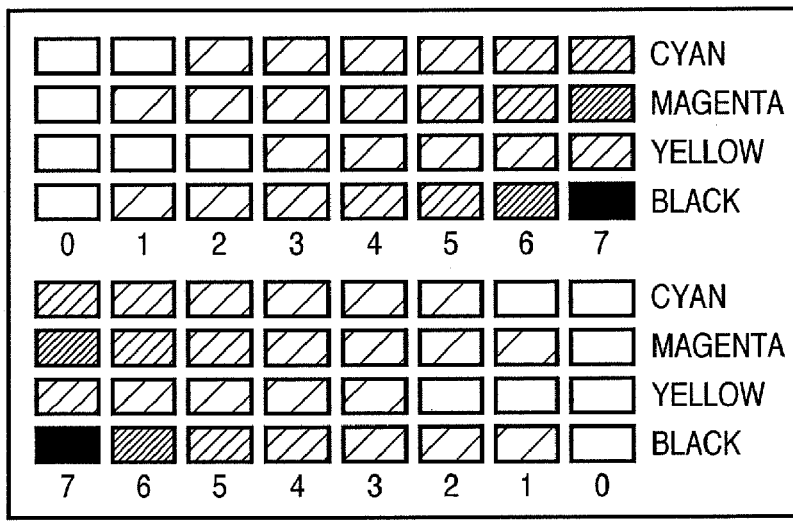
Figure 12C:
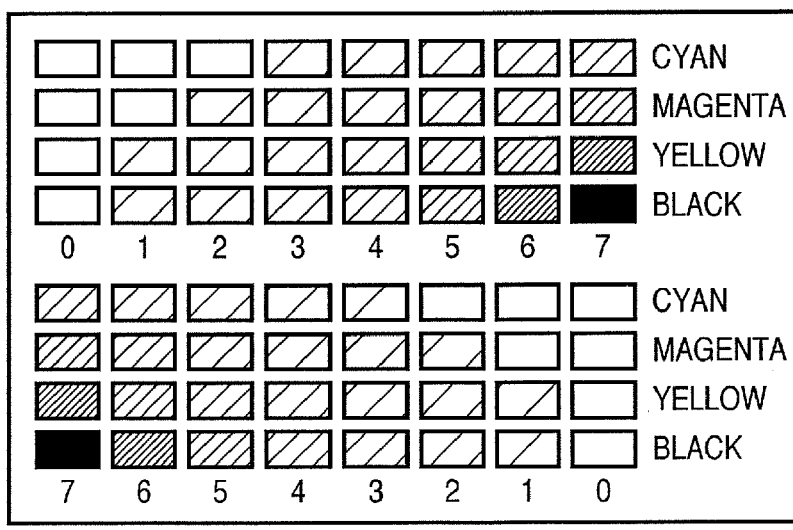

FIGS. 12A to 12C are views for explaining image data read from the sample charts.

As shown in FIGS. 12A to 12C, the RAM 207 stores the image data read from the sample charts as those for R, G, and B colors by color separation. FIGS. 12A to 12C illustrate image data of these color planes. FIG. 12A shows an R plane 1421, FIG. 12B shows a G plane 1422, and FIG. 12C shows a B plane 1423.

In FIGS. 12A to 12C, a portion closer to white indicates a region which has a larger read signal value and is brighter (has a lower density). A portion closer to black indicates a region which has a smaller read signal value and is darker (has a higher density). Therefore, the R plane 1421 expresses higher-density portions of patches of cyan C and black K as higher-density regions. Likewise, the G plane 1422 expresses higher-density portions of patches of magenta M and black K as higher-density regions. Also, the B plane 1423 expresses higher-density portions of patches of yellow Y and black K as higher-density regions. That is, the patch densities of cyan C are measured using image data of the R plane 1421, those of magenta M are measured using image data of the G plane 1422, and those of yellow Y are measured using image data of the B plane 1423. The patch densities of black K may be measured using image data of any of the R, G, and B planes. In this embodiment, the patch densities of black K are measured using image data of the G plane 1422.

Figure 13:
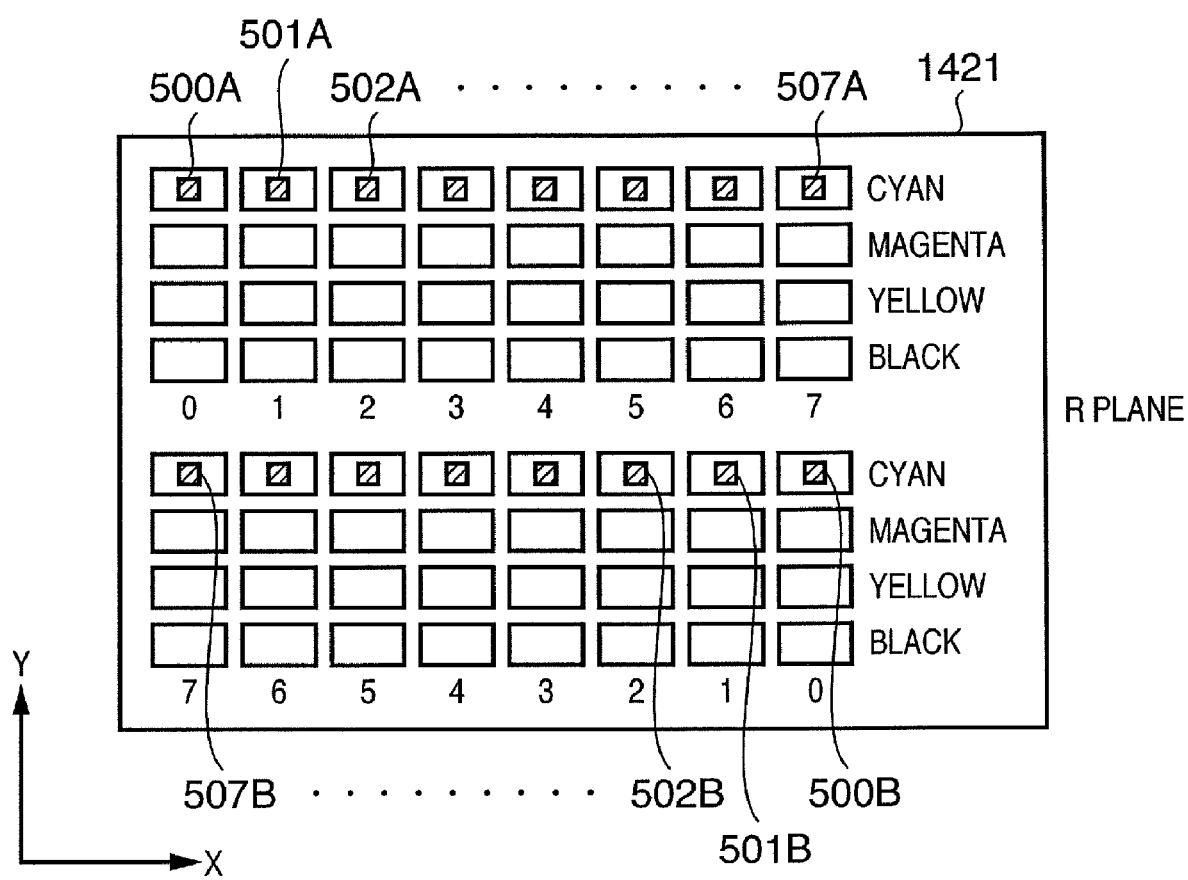
FIG. 13 shows image data of an R plane.

FIG. 13 shows the image data of the R plane 1421. Note that FIG. 13 shows the same image data as in FIG. 12A, but it shows only rectangles indicating patch positions but does not illustrate patterns indicating the brightness levels of patches.

The density measurement will be described below taking patches of cyan C as an example. The image data is a set of pixel values which are arranged in a matrix on a two-dimensional coordinate system. Therefore, the position and size of each patch can be designated using a coordinate value. Note that the coordinate value of each patch can be read out from the sample chart data, since the sample chart data used to print each sample chart describes the coordinate value of each patch.

Image data of a patch sequence of cyan C on the upper portion of the sample chart is extracted based on the coordinate position of a low-density patch (tone number 0) at the left end, and internal data $S(x, y)$ of a rectangular region 500A shown in FIG. 13 are read. Since the image data is expressed as a digital signal of about 8 bits, each data $S(x, y)$ assumes an integer value ranging from 0 to 255.

The data $S(x, y)$ is a set of pixel data in the rectangular region 500A, and the total number of pixel data is determined by the number of pixels included in the rectangular region 500A. Let Nx be the number of pixels of the rectangular region in the x-direction, and Ny be the number of pixels of the rectangular region in the y-direction. Then, the total number of data $S(x, y)$ is Nx×Ny. Hence, an average value Sm of the pixel values of the rectangular region 500A is calculated by:

$$Sm = \{\Sigma S(x, y)\}/\{Nx \times Ny\} \quad (1)$$

where $\Sigma S(x, y)$ is the sum total of pixel data in the rectangular region.

"Sc0A" expresses the obtained average value Sm since it means the average value of pixel data of the patch of tone number 0 in the patch sequence of cyan C on the upper portion of the sample chart.

For the second patch in the patch sequence of cyan C, an average value Sc1A of pixel data in a rectangular region 501A is calculated. Likewise, average values Sc2A, Sc3A, ..., Sc7A of rectangular regions 502A, 503A, ..., 507A are calculated.

Upon completion of the processing of the patch sequence of cyan C on the upper portion of the sample chart, the processing of a patch sequence of cyan C on the lower portion of the sample chart starts. In this case, contrary to the above processing, average values Sc0B, Sc1B, ..., Sc7B of rectangular regions 500B, 501B, ..., 507B are calculated in turn from a patch at the right end.

Note that the rectangular regions 500A and 500B, 501A and 501B, ..., 507A and 507B are respectively patches which reproduce the same tone values. Therefore, if there are no density variations depending on the output positions of the printer 1000 or if there are no variations of read values depending on the read positions of the scanner (or reader) 1001, the average values obtained from them should be equal to each other:

$$Sc0A = Sc0B \quad (2)$$

$$Sc1A = Sc1B$$

$$\vdots$$

$$Sc7A = Sc7B$$

However, in practice, the two average values are not always equal to each other due to various causes. Therefore, under the precondition that the above equations do not always hold, the average value of these two average values is processed as a true read value of each patch.

$$Sc0 = (Sc0A + Sc0B)/2 \quad (3)$$

$$Sc1 = (Sc1A + Sc1B)/2$$

$$\vdots$$

$$Sc7 = (Sc7A + Sc7B)/2$$

With the above processing, the average values of respective patches are calculated, and are converted into density values. Image data read by the reader 1001 is a luminance signal proportional to the reflectance of the sample chart, and appropriate logarithmic conversion processing is applied to convert that signal into a density value. In order to express a density value as an 8-bit integer value, the following conversion equation is used:

$$D = -255 \times \log_{10}(S/255)/2.0 \quad (4)$$

The above equation converts a luminance signal S with an original density=2.0 into D=255. When D>255, D is limited to 255. Using equation (4), Sc0, Sc1, ..., Sc7 obtained using equations (3) are converted into density values Dc0, Dc1, ..., Dc7:

$$Dc0 = -255 \times \log_{10}(Sc0/255)/2.0 \quad (5)$$

$$Dc1 = -255 \times \log_{10}(Sc1/255)/2.0$$

$$\vdots$$

$$Dc7 = -255 \times \log_{10}(Sc7/255)/2.0$$

The density values of patches of other colors, i.e., magenta M, yellow Y, and black K are similarly obtained. Density values obtained in this way are respectively described as Dm0 to Dm7, Dy0 to Dy7, and Dk0 to Dk7. Note that the conversion to a density value is not limited to each equation (5), and other conversion equations may be used. The relationship between luminance values and density values may be measured in advance to create a conversion table, and luminance-density conversion may be attained using the conversion table.

Figure 14:
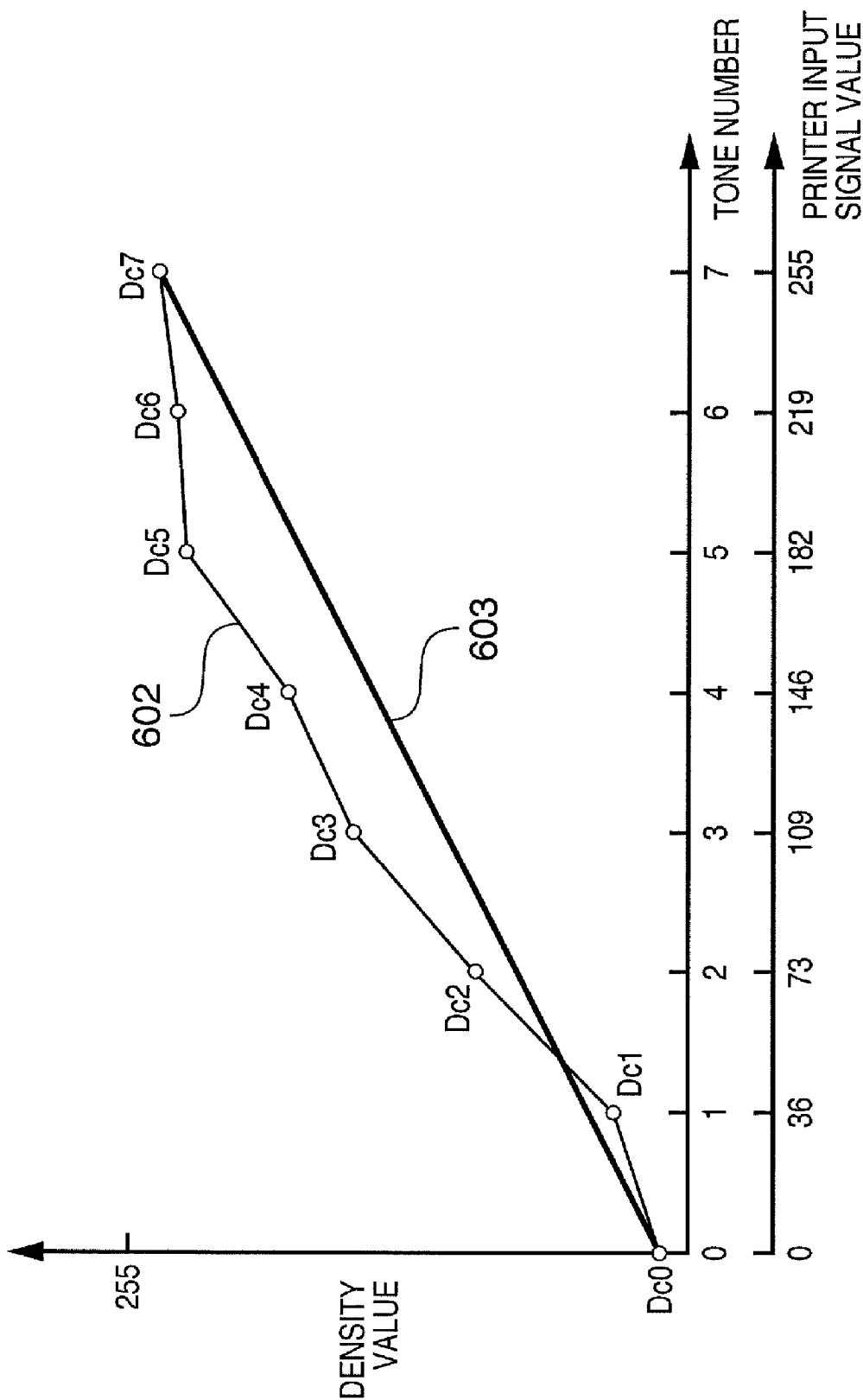
FIG. 14 is a graph showing a state obtained by plotting the density values of respective cyan patches in the order of tone numbers.

FIG. 14 is a graph showing a state obtained by plotting the density values Dc0 to Dc7 of respective patches of cyan C in the order of tone numbers.

Ideal density values of respective patches indicated by tone numbers 0 to 7 correspond to eight signal values obtained by sampling 8-bit signal values 0 to 255 at equal intervals if they are expressed in correspondence with signal values input to the printer 1000. The printer 1000 receives 8-bit CMYK signals, and expresses a tone image by forming dots on a print sheet by the electrophotography process based on these signal values. Since the printer 1000 prints respective patches based on signal values obtained by sampling 8-bit signal values at equal intervals, the abscissa in FIG. 14 has the following relationship:

| Tone number | Input signal value |
| --- | --- |
| 0 | 0 |
| 1 | 36 |
| 2 | 73 |
| 3 | 109 |
| 4 | 146 |
| 5 | 182 |
| 6 | 219 |
| 7 | 255 |

The characteristics indicated by a bold line 603 in FIG. 14 represent ideal density characteristics to be assumed by the density values of patches with respect to the input signal values of the printer 1000. That is, the printer 1000 preferably has linear output density characteristics proportional to the input signal values. However, since the input and output signal values of the printer 1000 do not have a linear relationship, the input signal values are corrected using the tone correction table (and interpolation calculations). When the tone correction table becomes relatively inappropriate due to factors such as aging of the printer 1000, environmental variations, and the like, density characteristics indicated by a curve 602 in FIG. 14 are obtained. Automatic tone correction corrects the density characteristics indicated by the curve 602 to those indicated by the line 603. More specifically, automatic tone correction is attained by changing the contents of the tone correction table.

In other words, the tone conversion table may have inverse characteristics of the curve 602 shown in FIG. 14. The CPU 205 calculates tone correction tables having the inverse characteristics of the curve 602 for C, M, Y, and K and updates tone correction tables of respective colors stored in the density correction unit 305. Then, the CPU 205 updates the tone correction tables corresponding to respective halftone processes, thus ending auto correction.

Manual Correction

Manual correction which can be selected on the UI shown in FIG. 10B uses halftone processes that can be executed by the image forming apparatus in an order which is set in advance to print sample charts, and updates the tone correction tables corresponding to the used halftone processes based on the sample charts.

If the user instructs manual correction in step S702, the CPU 205 sets a variable N=1 indicating an order (S708). The CPU 205 displays a UI shown in FIG. 10E on the console 208 to prompt the user to select whether or not a sample chart is printed using a halftone process set as the first process (e.g., error diffusion) (S709).

If the user presses a "sample chart print" button on the UI shown in FIG. 10E, the CPU 205 prints a sample chart using the first halftone process (S710). The CPU 205 displays a UI shown in FIG. 10F on the console 208. If the user presses a "sample chart read start" button on the UI shown in FIG. 10F, the CPU 205 instructs the reader controller 202 to read the sample chart set on the ADF 101. The reader controller 202 controls the operation of the ADF 101 to read the sample chart. The CPU 205 stores image data which is output from the reader controller 202 and has undergone A/D conversion and shading correction by the image signal controller 203 in the RAM 207 (S711).

Next, the CPU 205 generates and updates a tone correction table corresponding to the first halftone processing based on the image data of the sample chart stored in the RAM 207 as in the all correction (S712). However, unlike in the all correction, since the manual correction outputs only a sample chart using the halftone processes designated by the order set in the variable N, the CPU 205 updates only a tone correction table corresponding to the halftone process designated by the order set in the variable N. Unlike in the all correction, the manual correction does not require any identification code corresponding to the halftone processing information.

The CPU 205 then increments the variable N (S713), and checks if the variable N reaches the maximum number M of halftone processes that can be executed by the image forming apparatus (S714). If N<M, the process returns to step S709 to start tone correction corresponding to the halftone process in the next turn.

If the user presses a "cancel" button on the UI shown in FIG. 10, the CPU 205 increments the variable N (S713), and checks if the variable N reaches the maximum number M of halftone processes that can be executed by the image forming apparatus (S714). If N<M, the process returns to step S709 to start tone correction corresponding to the halftone process in the next turn.

In this way, the CPU 205 ends the manual processing if the variable N reaches the maximum number M of halftone processes that can be executed by the image forming apparatus.

As described above, the automatic tone correction for updating the tone correction tables allows the user to select whether tone correction is applied for each halftone process, or batch tone correction including all halftone processes is applied. If the batch tone correction is applied, batch automatic tone correction corresponding to a plurality of halftone processes is executed. That is, batch print and batch read processes of sample charts based on all the halftone processes are executed. Therefore, the need for the repetitive operations for printing and reading a sample chart for each halftone process can be obviated, thus greatly reducing the operation time of automatic tone correction. Since the identification information indicating the halftone processing method is appended to each sample chart, the automatic tone correction corresponding to the halftone processing method used can be applied even when sample charts are read in a wrong order.

Even when there are a plurality of methods of appending random noise in gradation by appending random noise to an image, the tone levels change. Images formed by changing the toner fixing speed have different degrees of gloss, resulting in a change in tone level of images. The above embodiment has exemplified the automatic tone correction for a plurality of halftone processes. Alternatively, the above batch/selective tone correction may be implemented for other image processes for a plurality of gradations, degrees of gloss, and the like.

Second Embodiment

Image processing according to the second embodiment of the present invention will be described below. Note that the same reference numerals in this embodiment denote the same parts as in the first embodiment, and a detailed description thereof will be omitted.

The second embodiment allows to select one of a plurality of halftone processes used to apply tone correction of those which can be executed by the image forming apparatus in place of the alternative of "auto correction" or "manual correction" upon executing the automatic tone correction. In an image forming apparatus which can execute many halftone processes, the following selection can be made: automatic tone correction corresponding to a halftone process with a high use frequency is executed, and that corresponding to a halftone process with a low use frequency is skipped.

Figure 15:
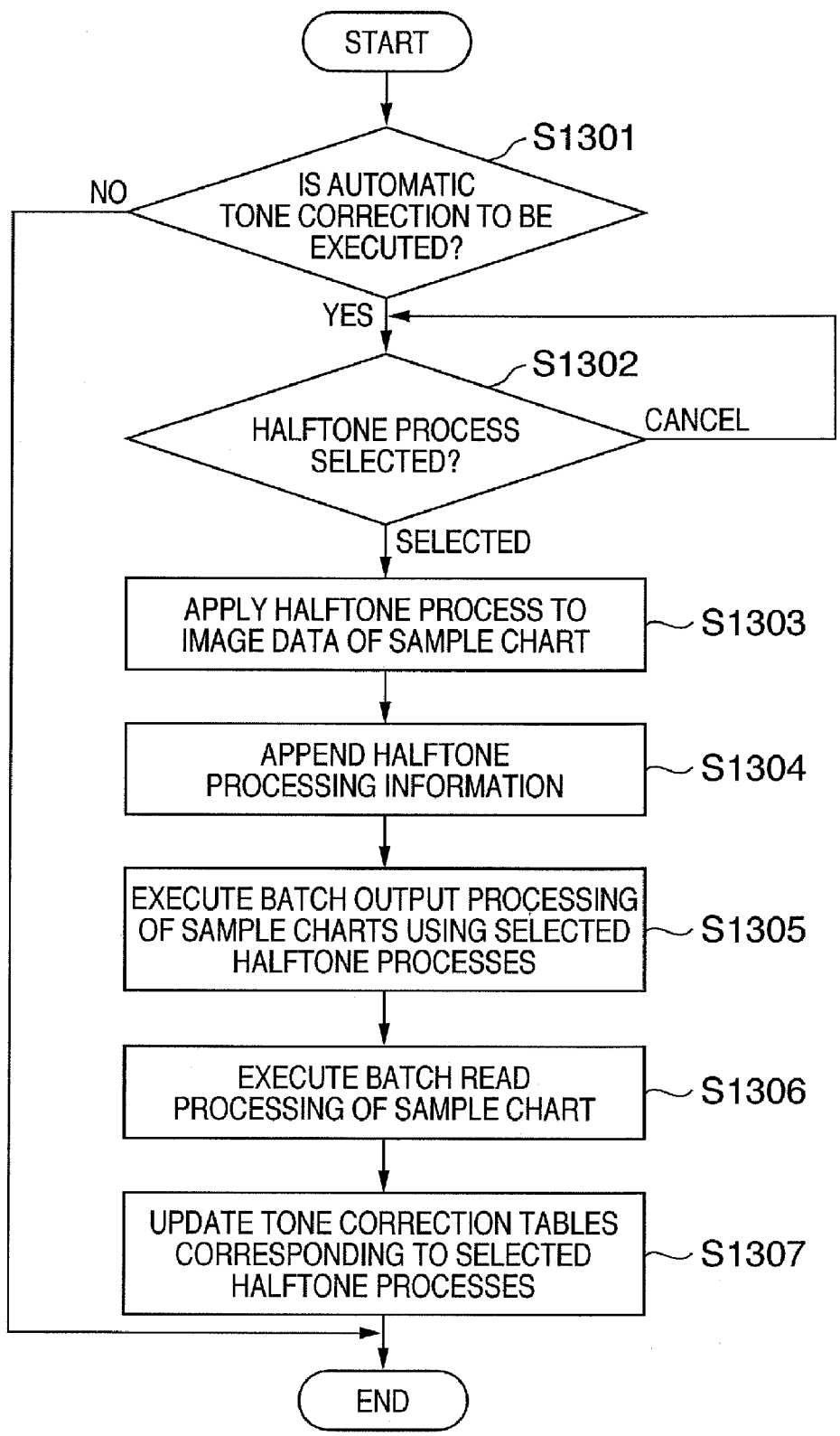
FIG. 15 is a flowchart showing the sequence of automatic tone correction processing according to the second embodiment of the present invention.

FIG. 15 is a flowchart showing the sequence of the automatic tone correction processing of the second embodiment. The CPU 205 executes this processing upon turning on the power switch of the image forming apparatus.

The CPU 205 displays the user interface (UI) shown in FIG. 10A on the console 208 to receive an instruction as to whether or not the user wants to execute automatic tone correction (S1301). If the user cancels execution of automatic tone correction, the processing ends. If the user instructs to execute automatic tone correction, the CPU 205 displays a UI shown in FIG. 16A on the console 208 to select halftone processes used to apply tone correction of those which can be executed by the image forming apparatus (S1302). When the number of halftone processes is too large to fall within a window, a scroll bar is displayed to allow display of all halftone processes.

If the user checks check boxes to select halftone processes used to apply correction, and presses an OK button, the CPU 205 displays a confirmation dialog shown in FIG. 16B, and waits until the user presses a "sample chart print start" button. If the user presses that button, the CPU 205 begins to print sample charts using the selected halftone processes. If the user presses a cancel button, the CPU 205 displays the UI shown in FIG. 16A again.

Upon reception of selection of the target halftone processes (FIGS. 16A and 16B show an example in which screen processes 1 and 2 are selected), and the subsequent "sample chart print start" instruction, the CPU 205 renders image data of a sample chart on the RAM 207 based on sample chart data stored in the ROM 206. The CPU 205 then inputs the image data of the sample chart to the image processor 304. The image processor 304 switches the processing path of the image data by switching the select signal sel every time it receives the image data of the sample chart, and executes the selected halftone process (S1303).

Then, the processing information appending unit 406 appends halftone processing information corresponding to the select signal sel to the image data of the sample chart that has undergone the halftone process (S1304). That is, the unit 406 appends halftone processing information to print information indicating the halftone processing method at a predetermined position of the sample chart.

The CPU 205 sets to pass through the processing of the density correction unit 305, and sends the image data of sample charts output from the image processor 304 to the printer 1000, thus executing batch (continuous) output processing of the sample charts (S1305).

If the user presses a "sample chart read start" button on the UI shown in FIG. 10D, the CPU 205 instructs the reader controller 202 to execute batch (continuous) read processing of the plurality of sample charts set on the ADF 101. The reader controller 205 controls the operation of the ADF 101 to convey the respective sample chart to the predetermined position of the platen grass 31, and scans the respective sample chart so as to read the image of the respective sample charts. The CPU 205 stores image data which are output from the reader controller 202 and have undergone A/D conversion and shading correction by the image signal controller 203 in the RAM 207 (S1306).

Next, the CPU 205 analyzes the image data of the sample charts stored in the RAM 207, calculates the density values of respective patches, and creates tone correction tables based on the calculated density values. The CPU 205 recognizes the identification code appended to each sample chart, and updates the tone correction table of the density correction unit 305 corresponding to the identification code (S1307). In this way, the CPU 205 creates the tone correction tables corresponding to all the read sample charts, and updates the tone correction tables of the density correction unit 305 corresponding to the identification codes appended to the sample charts.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-314841, filed Oct. 28, 2005, which is hereby incorporated by reference herein in its entirety.

What is claimed is:

1. An image processing apparatus having a reader which reads an original image, an image processor which is capable of executing plural kinds of image processing, a corrector which corrects image data output from the image processor, and a forming section which forms an image on a recording medium based on image data output from the corrector, said apparatus further comprising:
a generator, arranged to generate sample data to which the image processing is applied by the image processor, and to control the forming section to form a sample chart based on the sample data;
an updater, arranged to update tone correction characteristics of the corrector corresponding to the image processing based on image data of the sample chart acquired by the reader, wherein the sample chart is conveyed using a feeder of the reader; and
a controller, arranged to control said generator and said updater in accordance with an input user instruction indicating whether or not to execute batch update processing of the tone correction characteristics of the corrector corresponding to the plural kinds of image processing,
wherein, when the batch update processing is instructed, said generator adds information to the sample data to append identification information, which indicates the kind of image processing used in the generation of the sample data, to the sample chart, and said updater identifies the kind of image processing corresponding to the tone correction characteristics to be corrected from the identification information appended to the sample chart.

2. The apparatus according to claim 1, wherein said generator which received the batch update instruction generates a plurality of sample data which have undergone the plural kinds of image processing, and controls the forming section to form a plurality of sample charts based on the plurality of sample data, and said updater controls the reader to read image data of the plurality of sample charts and executes the batch update processing of the tone correction characteristics of the corrector corresponding to the plural kinds of image processing.

3. The apparatus according to claim 1, wherein said generator appends directional information required to identify a direction of the sample chart to the sample data.

4. The apparatus according to claim 3, wherein said updater determines the direction of the image data of the sample chart based on the directional information, and controls the image processor to rotate the image data of the sample chart when the direction is inappropriate.

5. An image processing apparatus having a reader which reads an original image, an image processor which is capable of executing plural kinds of image processing, a corrector which corrects image data output from the image processor, and a forming section which forms an image on a recording medium based on image data output from the corrector, said apparatus further comprising:
a generator, arranged to generate sample data to which the image processing is applied by the image processor, and to control the forming section to form a sample chart based on the sample data, wherein said generator adds information to the sample data to append identification information, which indicates the kind of image processing used in the generation of the sample data, to the sample chart;
an updater, arranged to update tone correction characteristics of the corrector corresponding to the image processing based on image data of the sample chart acquired by the reader, wherein the sample chart is conveyed using a feeder of the reader, and said updater identifies the kind of image processing corresponding to the tone correction characteristics to be corrected from the identification information appended to the sample chart; and
a controller, arranged to control said generator and said updater in accordance with an input user instruction indicating image processing used to update the tone correction characteristics of the plural kinds of image processing.

6. The apparatus according to claim 5, wherein said generator which received the batch update instruction generates at least one sample data which has undergone the image processing used to update, and controls the forming section to form at least one sample chart based on the at least one sample data, and said updater controls the reader to read image data of the at least one sample chart and updates the tone correction characteristics of the corrector corresponding to the image processing used to update.

7. The apparatus according to claim 5, wherein said generator appends directional information required to identify a direction of the sample chart to the sample data.

8. The apparatus according to claim 7, wherein said updater determines the direction of the image data of the sample chart based on the directional information, and controls the image processor to rotate the image data of the sample chart when the direction is inappropriate.

9. A method of controlling an image processing apparatus having a reader which reads an original image, an image processor which is capable of executing plural kinds of image processing, a corrector which corrects image data output from the image processor, and a forming section which forms an image on a recording medium based on image data output from the corrector, said method comprising the steps of:
   generating sample data to which the image processing is applied by the image processor, and controlling the forming section to form a sample chart based on the sample data;
   updating tone correction characteristics of the corrector corresponding to the image processing based on image data of the sample chart acquired by the reader, wherein the sample chart is conveyed using a feeder of the reader; and
   controlling the generating step and the updating step in accordance with an input user instruction indicating whether or not to execute batch update processing of the tone correction characteristics of the corrector corresponding to the plural kinds of image processing,
   wherein, when the batch update processing is instructed, information is added to the sample data to appends identification information, which indicates the kind of image processing used in the generation of the sample data, to the sample chart in the generating step, and the kind of image processing corresponding to the tone correction characteristics to be corrected is identified from the identification information appended to the sample chart in the updating step.

10. A method of controlling an image processing apparatus having a reader which reads an original image, an image processor which is capable of executing plural kinds of image processing, a corrector which corrects image data output from the image processor, and a forming section which forms an image on a recording medium based on image data output from the corrector, said method comprising the steps of:
   generating sample data to which the image processing is applied by the image processor, and controlling the forming section to form a sample chart based on the sample data, wherein information is added to the sample data to appends identification information, which indicates the kind of image processing used in the generation of the sample data, to the sample chart;
   updating tone correction characteristics of the corrector corresponding to the image processing based on image data of the sample chart acquired by the reader, wherein the sample chart is conveyed using a feeder of the reader, and the kind of image processing corresponding to the tone correction characteristics to be corrected is identified from the identification information appended to the sample chart; and
   controlling the generating step and the updating step in accordance with an input user instruction indicating image processing used to update the tone correction characteristics of the plural kinds of image processing.

11. A computer-readable storage medium storing a computer-executable program for causing a computer to perform a method of controlling an image processing apparatus having a reader which reads an original image, an image processor which is capable of executing plural kinds of image processing, a corrector which corrects image data output from the image processor, and a forming section which forms an image on a recording medium based on image data output from the corrector, the method comprising the steps of:
   generating sample data to which the image processing is applied by the image processor, and controlling the forming section to form a sample chart based on the sample data;
   updating tone correction characteristics of the corrector corresponding to the image processing based on image data of the sample chart acquired by the reader, wherein the sample chart is conveyed using a feeder of the reader; and
   controlling the generating step and the updating step in accordance with an input user instruction indicating whether or not to execute batch update processing of the tone correction characteristics of the corrector corresponding to the plural kinds of image processing,
   wherein, when the batch update processing is instructed, information is added to the sample data to appends identification information, which indicates the kind of image processing used in the generation of the sample data, to the sample chart in the generating step, and the kind of image processing corresponding to the tone correction characteristics to be corrected is identified from the identification information appended to the sample chart in the updating step.

12. A computer-readable storage medium storing a computer-executable program for causing a computer to perform a method of controlling an image processing apparatus having a reader which reads an original image, an image processor which is capable of executing plural kinds of image processing, a corrector which corrects image data output from the image processor, and a forming section which forms an image on a recording medium based on image data output from the corrector, the method comprising the steps of:
   generating sample data to which the image processing is applied by the image processor, and controlling the forming section to form a sample chart based on the sample data, wherein information is added to the sample data to appends identification information, which indicates the kind of image processing used in the generation of the sample data, to the sample chart;
   updating tone correction characteristics of the corrector corresponding to the image processing based on image data of the sample chart acquired by the reader, wherein the sample chart is conveyed using a feeder of the reader, and the kind of image processing corresponding to the tone correction characteristics to be corrected is identified from the identification information appended to the sample chart; and
   controlling the generating step and the updating step in accordance with an input user instruction indicating image processing used to update the tone correction characteristics of the plural kinds of image processing.

* * * * *